US012250554B2

(12) United States Patent
Ai et al.

(10) Patent No.: US 12,250,554 B2
(45) Date of Patent: Mar. 11, 2025

(54) SYSTEMS AND METHODS FOR RADIO RESOURCE CONTROL MANAGEMENT IN A SHARED NETWORK

(71) Applicant: ZTE CORPORATION, Guangdong (CN)

(72) Inventors: Jianxun Ai, Shenzhen (CN); He Huang, Shenzhen (CN); Yin Gao, Shenzhen (CN); Xiaojuan Shi, Shenzhen (CN); Yuan Gao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 373 days.

(21) Appl. No.: 17/213,818

(22) Filed: Mar. 26, 2021

(65) Prior Publication Data

US 2021/0219141 A1 Jul. 15, 2021

Related U.S. Application Data

(63) Continuation of application No. PCT/CN2018/108199, filed on Sep. 28, 2018.

(51) Int. Cl.
*H04L 29/06* (2006.01)
*H04W 12/06* (2021.01)
(Continued)

(52) U.S. Cl.
CPC ........... *H04W 12/69* (2021.01); *H04W 12/06* (2013.01); *H04W 76/11* (2018.02)

(58) Field of Classification Search
CPC ...... H04W 12/06; H04W 12/69; H04W 76/11
See application file for complete search history.

(56) References Cited

U.S. PATENT DOCUMENTS

| 2016/0037408 A1 | 2/2016 | Xu et al. |
| 2016/0262059 A1 | 9/2016 | Butala et al. |
| (Continued) | | |

FOREIGN PATENT DOCUMENTS

| CN | 101848553 A | 9/2010 |
| CN | 102006655 A | 4/2011 |
| (Continued) | | |

OTHER PUBLICATIONS

3rd Generation Partnership Project, "Technical Specification Group Radio Access Network; Evolved Universal Terrestrial Radio Access (E-UTRA); Radio Resource Control (RRC); Protocol specification (Release 15)" 3GPP TS 36.331, V15.1.0, Apr. 3, 2018, Sophia Antipolis, Valbonne, France (786 pages).

(Continued)

*Primary Examiner* — Joseph P Hirl
*Assistant Examiner* — Chi D Nguy
(74) *Attorney, Agent, or Firm* — Foley & Lardner LLP

(57) ABSTRACT

This disclosure relates generally to wireless communications and, more particularly, to systems and methods for radio resource control (RRC) connection management in a network sharing configuration, including an RRC resume from an RRC inactive state, and RRC re-establishment. In one embodiment, a method performed by a communication node, includes: receiving a request from a communication device to establish a current connection associated with a prior connection between the communication device and a prior communication node, wherein the request comprises communication device authentication information; and establishing the current connection based on a determination that communication node authentication information matches the communication device authentication information, wherein the communication node authentication information is based on a predetermined subset of input param- (Continued)

eters, and wherein the determination is performed at the communication node or at the prior communication node.

18 Claims, 6 Drawing Sheets

(51) Int. Cl.
*H04W 12/69* (2021.01)
*H04W 76/11* (2018.01)

(56) References Cited

U.S. PATENT DOCUMENTS

| | | | | |
|---|---|---|---|---|
| 2017/0295489 | A1* | 10/2017 | Agiwal | H04W 12/0433 |
| 2018/0041898 | A1* | 2/2018 | Hampel | H04W 88/10 |
| 2020/0322787 | A1* | 10/2020 | Sivavakeesar | H04W 24/02 |
| 2020/0323011 | A1* | 10/2020 | Lehtovirta | H04W 12/0471 |

FOREIGN PATENT DOCUMENTS

| | | |
|---|---|---|
| CN | 102036243 A | 4/2011 |
| CN | 103546989 A | 1/2014 |
| CN | 103748924 A | 4/2014 |
| CN | 107295515 A | 10/2017 |
| WO | WO-2018/138163 A1 | 8/2018 |

OTHER PUBLICATIONS

3rd Generation Partnership Project, "Technical Specification Group Services and System Aspects; Security architecture and procedures for 5G system (Release 15)" 3GPP TS 33.501, V15.2.0, Sep. 21, 2018 (176 pages).
Second Office Action for KR Appl. No. 10-2021-7012697, dated Nov. 25, 2022 (with English translation, 11 pages).
3rd Generation Partnership Project, "Technical Specification Group Radio Access Network; Evolved Universal Terrestrial Radio Access (E-UTRA); Radio Resource Control (RRC); Protocol Specification (Release 15)" 3GPP TS 36.331, V15.1.0, Mar. 1, 2018 (6 pages).
3rd Generation Partnership Project, "Technical Specification Group Services and System Aspects; Security architecture and procedures for 5G system (Release 15)" 3GPP TS 33.501, V15.2.0, Sep. 1, 2018 (4 pages).
Ericsson et al., "Retrieve UE Context at UE Re-establishment" 3GPP TSG-RAN WG3 Meeting #100, R3-183521, May 21, 2018, Busan, South Korea (7 pages).
First Office Action for JP Appl. No. 2021-517048, dated Jun. 15, 2022 (with English translation, 14 pages).
First Office Action for KR Appl. No. 10-2021-7012697, dated Jun. 24, 2022 (with English translation, 10 pages).
Huawei et al., "Update ResumeMAC-I calculation" 3GPP TSG-SA WG3 (Security) Meeting #92 ad-hoc, S3-182852, Sep. 24, 2018, Harbin, China (3 pages).
Ericsson: "Cell ID in MAC-I calculation at Resume and Re-establish" 3GPP TSG-RAN WG2 Meeting #103bis; R2-1814077; Oct. 12, 2018; Chengdu, PRC (3 pages).
International Search Report and Written Opinion for PCT Appl. No. PCT/CN2018/108199 mailed Jun. 28, 2019 (7 pages).
Ericsson: "CR to 38.331 on Cell identifier for MAC-I calculation at resume and reestablishment" 3GPP TSG-RAN2 Meeting #103bis; R2-1814078; Oct. 12, 2018; Chengdu, China (4 pages).
Extended European Search Report for EP Appl. No. 18930246.6, dated Oct. 8, 2021 (12 pages).
Nokia et al.: "Identification of serving PLMN in RRC re-establishment scenario in shared networks" 3GPP TSG-RAN WG3 Meeting #101; R3-184741; Aug. 24, 2018; Gothenburg, Sweden (4 pages).
ZTE: "Discussion on PLMN information for RRC Resume/Reestablishment" 3GPP TSG RAN WG3 Meeting #102; R3-186527; Nov. 16, 2018; Spokane, USA (6 pages).
Ericsson, "Data forwarding for Retrieve UE Context in case of RRC connection re-establishment", 3GPP TSG-RAN WG2 Meeting #103, R2-1813495, Aug. 28, 2018, Gothenburg, Sweden (3 pages).
Penultimate Office Action on JP Appl. No. 2021-517048, dated Feb. 24, 2023 (with English translation, 7 pages).
Qualcomm Incorporated, "UE AS Context for RRC_Inactive", 3GPP TSG-RAN WG2 Meeting #101bis, R2-1805090, Apr. 20, 2018, Sanya, China (4 pages).

* cited by examiner

SYSTEMS AND METHODS FOR RADIO RESOURCE CONTROL MANAGEMENT IN A SHARED NETWORK

CROSS-REFERENCE TO RELATED APPLICATION

This application claims the benefit of priority under 35 U.S.C. § 120 as a continuation of PCT Patent Application No. PCT/CN2018/108199, filed on Sep. 28, 2018, the disclosure of which is incorporated herein by reference in its entirety.

TECHNICAL FIELD

This disclosure relates generally to wireless communications and, more particularly, to systems and methods for radio resource control (RRC) connection management in a network sharing configuration, including an RRC resume from an RRC inactive state, and RRC re-establishment.

BACKGROUND

As the number of applications and services for digital data continues to explode, the demands and challenges placed on network resources and operators will continue to increase. Being able to deliver a wide variety of network performance characteristics that future services will demand is one of the primary technical challenges faced by service providers today.

In a network sharing configuration, a cell can be configured with multiple identifiers, such as public land mobile network (PLMN) identifiers and cell identifiers associated with the same cell. Also, different cells can be configured with the same cell identifiers (e.g., cell identifiers that identify a cell with an associated base station (BS)) but be associated with different PLMNs. The inconsistency across this information may lead to inconsistencies amongst BSes and user equipment devices (UEs) as to what specific values to utilize to determine authentication information (e.g., a shortMAC-I) for procedures such as a radio resource control (RRC) resume procedure, RRC re-establishment procedure, or procedures associated with a handover from one BS to another.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

In one embodiment, a method performed by a communication node, includes: receiving a request from a communication device to establish a current connection associated with a prior connection between the communication device and a prior communication node, wherein the request comprises communication device authentication information; and establishing the current connection based on a determination that communication node authentication information matches the communication device authentication information, wherein the communication node authentication information is based on a predetermined subset of input parameters, and wherein the determination is performed at the communication node or at the prior communication node.

In a further embodiment, a method performed by a communication device includes: producing communication device authentication information based on a predetermined subset of input parameters; and sending, to a communication node, a request to establish a current connection associated with a prior connection between the communication device and a prior communication node, wherein the request comprises the communication device authentication information, wherein the communication node is configured to: establish the current connection based on a determination that communication node authentication information matches the communication device authentication information, wherein the communication node authentication information is based on the predetermined subset of input parameters, and wherein the determination is performed at the communication node or at the prior communication node.

In a further embodiment, a communication node includes: a transceiver configured to: receive a request from a communication device to establish a current connection associated with a prior connection between the communication device and a prior communication node, wherein the request comprises communication device authentication information; and at least one processor configured to: establish the current connection based on a determination that communication node authentication information matches the communication device authentication information, wherein the communication node authentication information is based on a predetermined subset of input parameters, and wherein the determination is performed at the communication node or at the prior communication node.

In a further embodiment, a communication device includes: a processor configured to: produce communication device authentication information based on a predetermined subset of input parameters; and a transceiver configured to: send, to a communication node, a request to establish a current connection associated with a prior connection between the communication device and a prior communication node, wherein the request comprises the communication device authentication information, wherein the communication node is configured to: establish the current connection based on a determination that communication node authentication information matches the communication device authentication information, wherein the communication node authentication information is based on the predetermined subset of input parameters, and wherein the determination is performed at the communication node or at the prior communication node.

BRIEF DESCRIPTION OF THE DRAWINGS

Various exemplary embodiments of the invention are described in detail below with reference to the following Figures. The drawings are provided for purposes of illustration only and merely depict exemplary embodiments of the invention to facilitate the reader's understanding of the invention. Therefore, the drawings should not be considered limiting of the breadth, scope, or applicability of the invention. It should be noted that for clarity and ease of illustration these drawings are not necessarily drawn to scale.

DETAILED DESCRIPTION OF EXEMPLARY EMBODIMENTS

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described and illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

The discussion below may refer to functional entities or processes which are similar to those mentioned above with respect to conventional communication systems. As would be understood by persons of ordinary skill in the art, however, such conventional functional entities or processes do not perform the functions described below, and therefore, would need to be modified or specifically configured to perform one or more of the operations described below. Additionally, persons of skill in the art would be enabled to configure functional entities to perform the operations described herein after reading the present disclosure.

Figure 1:
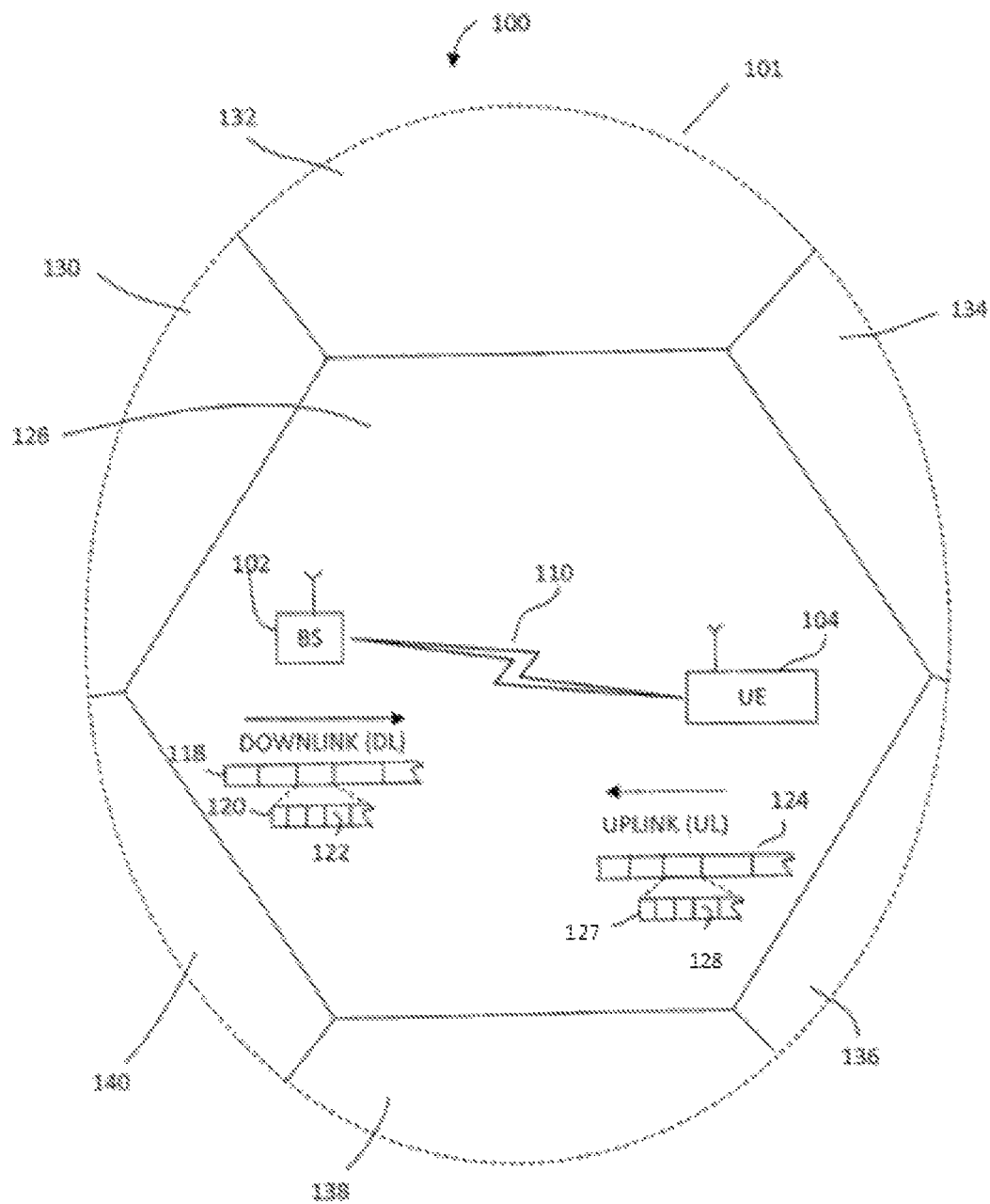
FIG. 1 illustrates an exemplary cellular communication network in which techniques disclosed herein may be implemented, in accordance with an embodiment of the present disclosure.

FIG. 1 illustrates an exemplary wireless communication network 100 in which techniques disclosed herein may be implemented, in accordance with an embodiment of the present disclosure. Such an exemplary network 100 includes a base station 102 (hereinafter "BS 102") and multiple user equipment devices 104 (hereinafter "UEs 104") that can communicate with each other via respective communication links 110 (e.g., a wireless communication channel), and a cluster of notional cells 126, 130, 132, 134, 136, 138 and 140 overlaying a geographical area with a network 101. Each UE 104 may undergo a random access procedure to join the network 101. In FIG. 1, the BS 102 and each UE 104 are contained within a respective geographic boundary of cell 126. Each of the other cells 130, 132, 134, 136, 138 and 140 may include at least one BS operating at its allocated bandwidth to provide adequate radio coverage to its intended users. Accordingly, reference to a cell may be a short hand reference to a BS with an associated coverage region or area (e.g., cell). In certain embodiments, a cell may be interchangeably referred to as a BS or a node.

For example, the BS 102 may operate at an allocated channel transmission bandwidth (e.g., spectrum) to provide adequate coverage to each UE 104. The spectrum may be regulated to define a licensed range and/or an unlicensed range. The BS 102 and each UE 104 may communicate via a downlink radio frame 118, and an uplink radio frame 124 respectively. The radio frames may also be referred to more simply as a frame. Each frame 118/124 may be further divided into sub-frames 120/127 which may include data symbols 122/128. In the present disclosure, the BS 102 and each UE 104 are described herein as non-limiting examples of "communication nodes," generally, which can practice the methods disclosed herein. Such communication nodes may be capable of wireless and/or wired communications, in accordance with various embodiments of the invention. In certain embodiments, a communication device may refer more specifically to a UE in relationship to a BS and a communication node may refer more specifically to a BS in relation to the UE.

Figure 2:
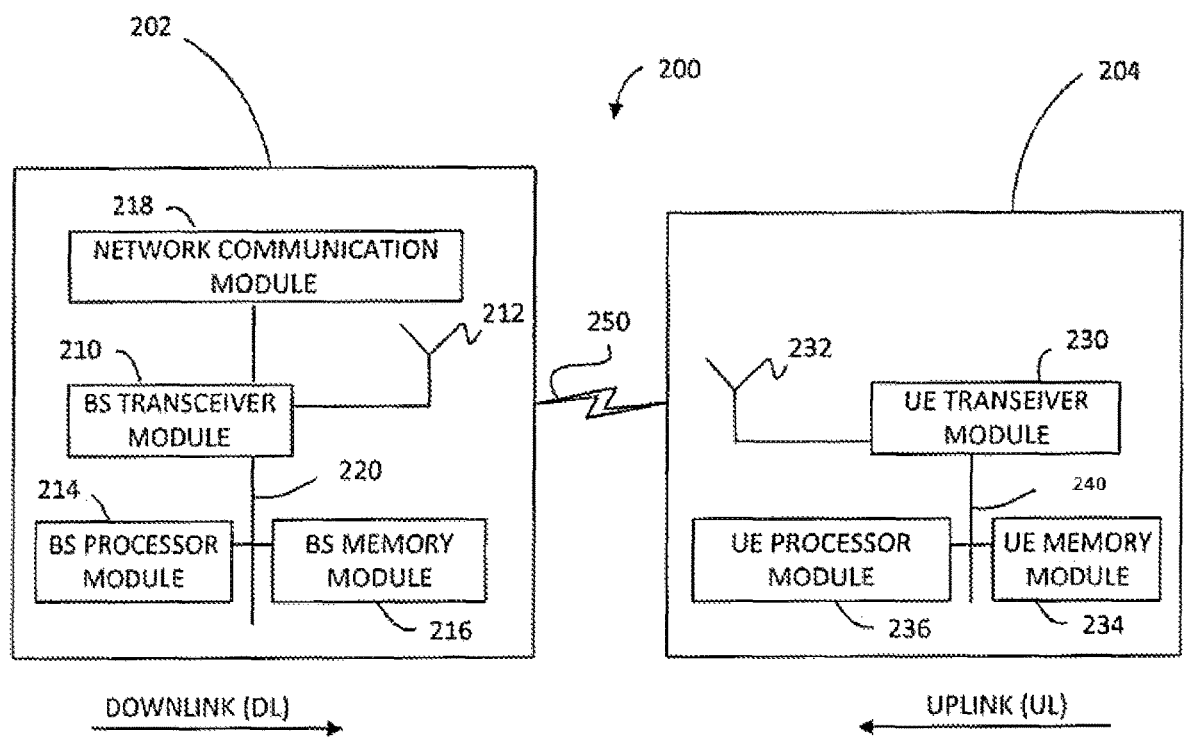
FIG. 2 illustrates block diagrams of an exemplary base station (BS) and a user equipment (UE) device, in accordance with some embodiments of the present disclosure.

FIG. 2 illustrates a block diagram of an exemplary wireless communication system 200 for transmitting and receiving wireless communication signals (e.g., OFDM/OFDMA signals) in accordance with some embodiments of the invention. The system 200 may include components and elements configured to support known or conventional operating features that need not be described in detail herein. In one exemplary embodiment, system 200 can be used to transmit and receive data symbols in a wireless communication environment such as the wireless communication environment or network 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium known in the art suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present invention.

In accordance with some embodiments, the UE transceiver module 230 may be referred to herein as an "uplink" transceiver module 230 that includes a RF transmitter and receiver circuitry that are each coupled to the antenna 232. A duplex switch (not shown) may alternatively couple the uplink transmitter or receiver to the uplink antenna in time duplex fashion. Similarly, in accordance with some embodiments, the BS transceiver module 210 may be referred to herein as a "downlink" transceiver module 210 that includes RF transmitter and receiver circuitry that are each coupled to the antenna 212. A downlink duplex switch may alternatively couple the downlink transmitter or receiver to the downlink antenna 212 in time duplex fashion. The operations of the two transceiver modules 210 and 230 are coordinated in time such that the uplink receiver is coupled to the uplink antenna 232 for reception of transmissions over the wireless transmission link 250 at the same time that the downlink transmitter is coupled to the downlink antenna 212. Preferably there is close time synchronization with only a minimal guard time between changes in duplex direction.

The UE transceiver module 230 and the BS transceiver module 210 are configured to communicate via the wireless data communication link 250, and cooperate with a suitably configured RF antenna arrangement 212/232 that can support a particular wireless communication protocol and modulation scheme. In some exemplary embodiments, the UE transceiver module 210 and the BS transceiver module 210 are configured to support industry standards such as the Long Term Evolution (LTE) and emerging 5G standards, and the like. It is understood, however, that the invention is not necessarily limited in application to a particular standard and associated protocols. Rather, the UE transceiver module 230 and the BS transceiver module 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage and/or computer-readable medium known in the art. In this regard, memory modules 216 and 234 may be coupled to the transceiver modules 210 and 230, respectively, such that the transceiver modules 210 and 230 can read information from, and write information to, memory modules 216 and 234, respectively. The memory modules 216 and 234 may also be integrated into their respective transceiver modules 210 and 230. In some embodiments, the memory modules 216 and 234 may each include a cache memory for storing temporary variables or other intermediate information during execution of instructions to be executed by transceiver modules 210 and 230, respectively. Memory modules 216 and 234 may also each include non-volatile memory for storing instructions to be executed by the transceiver modules 210 and 230, respectively.

The network communication module 218 generally represents the hardware, software, firmware, processing logic, and/or other components of the base station 202 that enable bi-directional communication between the BS transceiver module 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that the BS transceiver module 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically or virtually constructed, programmed, formatted and/or arranged to perform the specified operation or function.

A radio resource control (RRC) inactive state (RRC INACTIVE) may refer to a particular radio resource control (RRC) state. In the RRC inactive state, both a UE and an BS, also referred to as a radio access network (RAN) node, may maintain UE access stratum (AS) context information within a cell (e.g., an area of coverage with an associated BS). The BS may be a logical or physical network element which manages a cell (e.g., coverage over a single area) or a group of cells (e.g., coverage over a group of areas). This UE AS context information may be referred to more simply as UE context information. This UE context information may include, for example, a security context for the UE, a configuration of a signaling radio bearer (SRB), a configuration of a data radio bearer (DRB), and a configuration of a user plane protocol layer. The user plane protocol layer may include a packet data convergence protocol (PDCP), and radio link control (RLC). A UE in the RRC inactive state may have no dedicated radio resources allocated. Accordingly, the BS (e.g., radio access network node (RAN node)) may maintain a control plane and user plane connection to a core network (CN) for the UE in the RRC inactive state. Also, the BS that maintains UE context information of the UE may be referred to as a source BS (e.g., source node) associated with the UE.

The UE may resume the RRC connection from the RRC inactive state through a RRC resume procedure to return to an RRC connected state (RRC_CONNECTED). The RRC connected state may be a state in which the UE was in before entering the RRC inactive state. Specifically, as part of performing a random access channel (RACH) procedure, the UE may send a RRC resume request message to the BS. The RRC resume request message may include a UE identifier and authentication information. The authentication information may be a shortMAC-I, as espoused by the 3GPP radio access network (RAN) specification. The input parameters used to calculate the shortMAC-I may include, for example: a cell identifier for the BS associated with the cell (also referred to as a target cell identifier), a physical cell identity (PCI), a cell radio network temporary identifier (C-RNTI) allocated to the UE by a source BS, and a security key (e.g., an RRC integrity protection key $K_{RRCINC}$) used by the UE in either the source cell (e.g., cell associated with the source BS) or the target cell (e.g., cell associated with the target BS). The cell identifier may be of the cell (e.g., cell associated with a BS) in which the UE initiates a resume procedure. Also, the physical cell identity (PCI) of the source cell may be the cell in which UE most recently transitioned to an RRC inactive state A target BS (e.g., target BS or RAN node that provides service covered by a particular cellular area) that receives an RRC resume request message from a UE may determine a source BS associated with the UE using the identifier information of the UE (e.g., the UE's identifier). The target BS may then send a retrieve UE context request message to the source BS associated with the UE. The retrieve UE context request message may include, for example, the identity of the target cell (e.g., an identifier of the cell associated with the target BS), a UE identifier (e.g., a radio network temporary identifier (I-RNTI)), and the authentication information received from the UE (e.g., a shortMAC-I).

The source BS associated with the UE may determine (e.g., calculate) the authentication information shortMAC-I of the UE using similar input parameters as the UE. Also, these input parameters may include the security key stored in the UE context information, the PCI of the source cell (e.g., the cell associated with the source BS), the identifier C-RNTI of the UE while associated with the source cell, and the cell identifier carried in the retrieve UE context request message. The source BS may compare the UE authentication information carried in the retrieve UE context request message with the UE authentication information determined by the source BS to verify the authenticity of the UE.

If the authentication information matches (e.g., if the authenticity of the UE is verified), the source may derive a new security key to be used by the UE in the target cell (e.g., when associated with the cell of the target BS). The input parameters for deriving the new key include, for example, the PCI of the target cell, the downlink center frequency of the target cell (e.g., a evolved universal mobile telecommunication systems terrestrial radio access (E-UTRA) absolute radio frequency channel number in downlink (ERFCN-DL) or an absolute radio frequency channel number in downlink (ARFCN-DL)), and a key used by the UE while associated with a source cell (e.g., when within a cell of the source BS) and/or a fresh next hop (NH) parameter value stored in the UE context information. The source BS associated with the UE may send the new security key to the target BS associated with the UE by using a retrieve UE context information response message.

The RRC re-establishment procedure is similar to the above referenced RRC resume procedure. As part of the RRC re-establishment procedure, the UE may send a RRC re-establishment request message to a target BS that has the following information: a UE identifier, the source cell PCI, the C-RNTI used by UE when in the cell of the source cell, and UE authentication information. The UE authentication information may be calculated using a security key, a cell identifier of the BS associated with the UE, a source cell PCI, and a C-RNTI associated with the source cell.

In situations where the target BS has the authentication information and security key information of the UE associated with the target cell, the target BS may compare the UE authentication information carried in the RRC re-establishment request message with the authentication information stored on the target BS. At this time, the UE authentication information associated with the target cell may be from a source BS (e.g., RAN node). The source BS (e.g., RAN node) may use handover preparation information or a handover request message to transfer to the target BS or target RAN node a set of re-establishment information. This re-establishment information may include: a target cell identifier (e.g., a cell identifier of the cell of the target BS), a security key, and UE authentication information (e.g., a shortMAC-I). The security key may be the security key used in the cell identified by the target cell identifier (e.g., a cell identifier that identifies the cell of the target BS). The UE authentication information may be used to perform UE authentication when the UE initiates RRC re-establishment associated with a cell identified by the cell identifier.

If the target BS or RAN node does not have the re-establishment information of the UE, the target BS or RAN node may send a retrieve UE context request message to the source RAN node. The retrieve UE context request message may carry a UE identifier, a source cell PCI identifier, a source C-RNTI, the target cell identifier associated with the target cell (e.g., cell identity), and the UE authentication information sent by the UE in the RRC re-establishment request message. The source BS or RAN node may determine locally stored UE context information according to the UE identifier. The source BS or RAN node may also verify the authentication information provided by the UE. If the authentication information is verified (e.g., matches with what the source BS or RAN node itself determined as the authentication information), the source BS or RAN node may derive a security key to be used by the UE and/or by the target BS.

In various embodiments, a UE may initiate a radio resource control (RRC) connection resume procedure or a RRC re-establishment procedure with a BS (e.g., with the cell of the BS). Such a cell may be associated with a number of different public land mobile network (PLMN) identifiers (IDs) and cell identifiers (e.g., of the cell associated with the BS). These PLMN identifiers may be associated with cell identifiers (e.g., identifiers of a cell). For example, a single cell identifier may be associated with different PLMN identifiers. Also, in other situations, different cell identifiers of different cells may be associated with a same PLMN identifier. Furthermore, a single cell may be associated with different combinations of PLMN identifiers and cell identifiers.

Performance of an RRC resume procedure or a RRC re-establishment procedure by a UE from an RRC inactive state may utilize a PLMN that is different from a PLMN utilized prior to the UE entering the RRC inactive state (e.g., when the UE was in the prior active state). This inconsistency among PLMN selection may be referred to as inter-PLMN cell re-selection. Also, performance of the RRC resume procedure after inter-PLMN BS re-selection may be referred to as inter-PLMN RRC resumption.

A UE may perform cell re-selection when a radio link failure occurs, such as in a handover procedure. However, the PLMN selected by the UE may be different than the PLMN selected by the UE prior to the handover or before the radio link failure. This inconsistency among PLMN selection in a RRC re-establishment procedure may be referred to as inter-PLMN RRC re-establishment.

In performance of such inter-PLMN cell re-selection, inter-PLMN RRC resumption, or inter-PLMN RRC re-establishment, the target BS that receives a RRC re-establishment request or a RRC resume request may utilize different input parameter values than that of the requesting UE. Accordingly, the BS and UE may have difficulty in determining and matching authentication information if the parameters utilized to determine the authentication information are different.

For example, this inconsistency among input parameters may mean that the target BS is unable to determine the cell identifier (e.g., cell identity that identifies a cell) to be utilized for authentication information determination or to be referenced in messages sent from the target BS to the source BS. As noted above the UE's authentication information may be incapable of verification (e.g., matching determinations at the UE and BS sides) when different cell identifier values are utilized as input parameters.

Furthermore, in shared network configurations, the different cells may have identical cell identifiers with different PLMN IDs. Thus, the source BS may have difficulty in uniquely determining the target cell. Due to this inconsistency, the source BS may derive a security key different than that derived by the UE as different input parameters (e.g., as different PCI or ARFCN-DL values) may be utilized by the UE and the source BS. Therefore, systems and methods in accordance with various embodiments may verify authentication information in accordance with a set of rules that uniquely identifies the input parameters for authentication information determination.

Figure 3A:
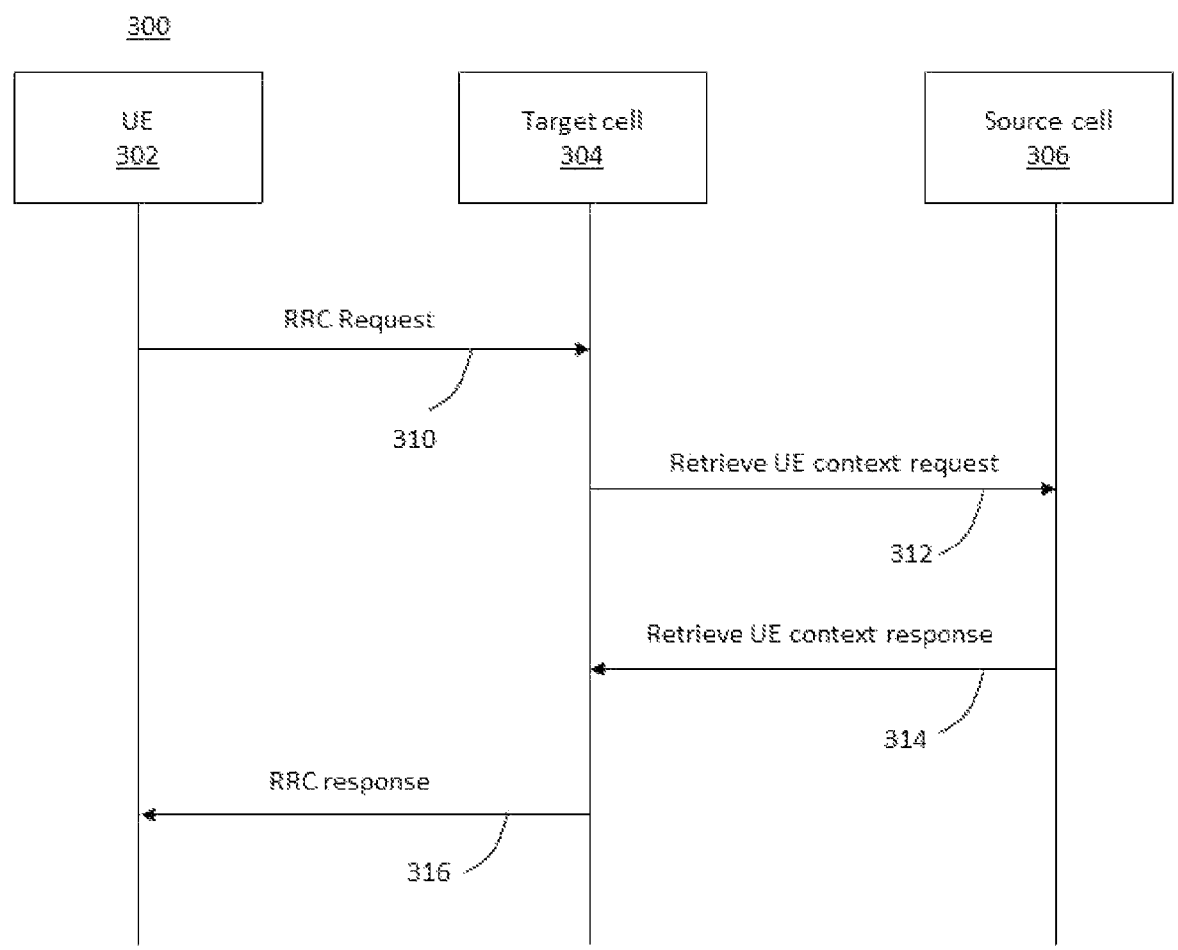
FIG. 3A is a block diagram of a radio resource control (RRC) setup procedure, in accordance with various embodiments.

FIG. 3A is a block diagram of a radio resource control (RRC) set up procedure 300, in accordance with various embodiments. The RRC set up procedure 300 may be performed between a UE 302, a target BS 304, and a source BS 306. Each of the target BS 304 and the source BS 306 may be referred to, respectively, as a target BS or target node and a source BS or source node in certain embodiments. The target BS 304 may be a BS that the UE 302 is seeking to connect and communicate with. The source BS 306 may be a BS that the UE 302 has previously connected and communicated with. The UE 302, target BS 304 and source BS 306 may be the same type of UE and/or BS as those illustrated above in FIGS. 1 and 2, but are remunerated in FIG. 3A and onward for ease of explanation.

At operation 310, the UE 302 may send a message requesting connection with the target BS 304. As will be discussed further below, this message may be a RRC resume request or a RRC re-establishment request message. The message may include UE information, which may be utilized for verification of UE authentication information. This UE information may include a UE identifier, the UE authentication information (e.g., UE generated authentication information, such as a shortMAC-I) as will be discussed in further detail below. Accordingly, this UE information may include various parameters to that may be selected and/or processed for verification of UE authentication information in a particular manner, as will also be discussed in detail below. Also, a BS and a UE may select the same parameters to determine authentication information, as will also be discussed in further detail below.

At operation 312, the target BS 304 may send a message to the source BS 306 for retrieval of UE context information. This request may include a UE context request, also termed as a retrieve UE context request message. This retrieve UE context request message may include UE context request information, such as an indication of the target cell ID, UE ID, UE generated authentication information (e.g., UE authentication information), and the like. The source BS 306 may utilize the information included in the UE context request and produce authentication information to be used for verification, as performed by the source BS 306. In certain embodiments, the UE context request may be based on the UE information.

Accordingly, based on the information provided to the source BS 306 in the above referenced operations, the source BS 306 may generate authentication information at the source BS and perform verification via a determination of whether the UE 302 generated authentication information (e.g., UE authentication information) and source BS 306 generated authentication information matches. The UE may be verified (e.g., determined to be a verified UE that the target BS may establish a connection for communication with) when the UE 302 generated authentication information (e.g., UE authentication information) and source BS 306 generated authentication information matches. Also, when the UE is verified in such a manner, the source BS 306 may generate a new security key to be used for future communications between the UE 302 and the target BS 304 when the UE 302 is in the target cell (e.g., the cell associated with the target BS 304).

At operation 314, the source BS 306 may send a message to the target BS 304 in reply to the message in operation 312. This message may include a UE context information response. This UE context information response may be provided in response to the UE context request. The UE context information response may include the new security key produced by the source BS 306. This new security key may be used for future communications between the UE 302 and the target BS 304.

At operation 316, the target BS 304 may send a message to the UE 302 with target BS response information. This message may be a resume or re-establishment message that establishes a communication connection (e.g., the connection requested by the UE in operation 310) between the target BS 304 and the UE 302. Stated another way, the target response information may include an indication that a connection with the target BS 304 is established based on the UE authentication information matching the authentication information produced by the source BS 306.

Figure 3B:
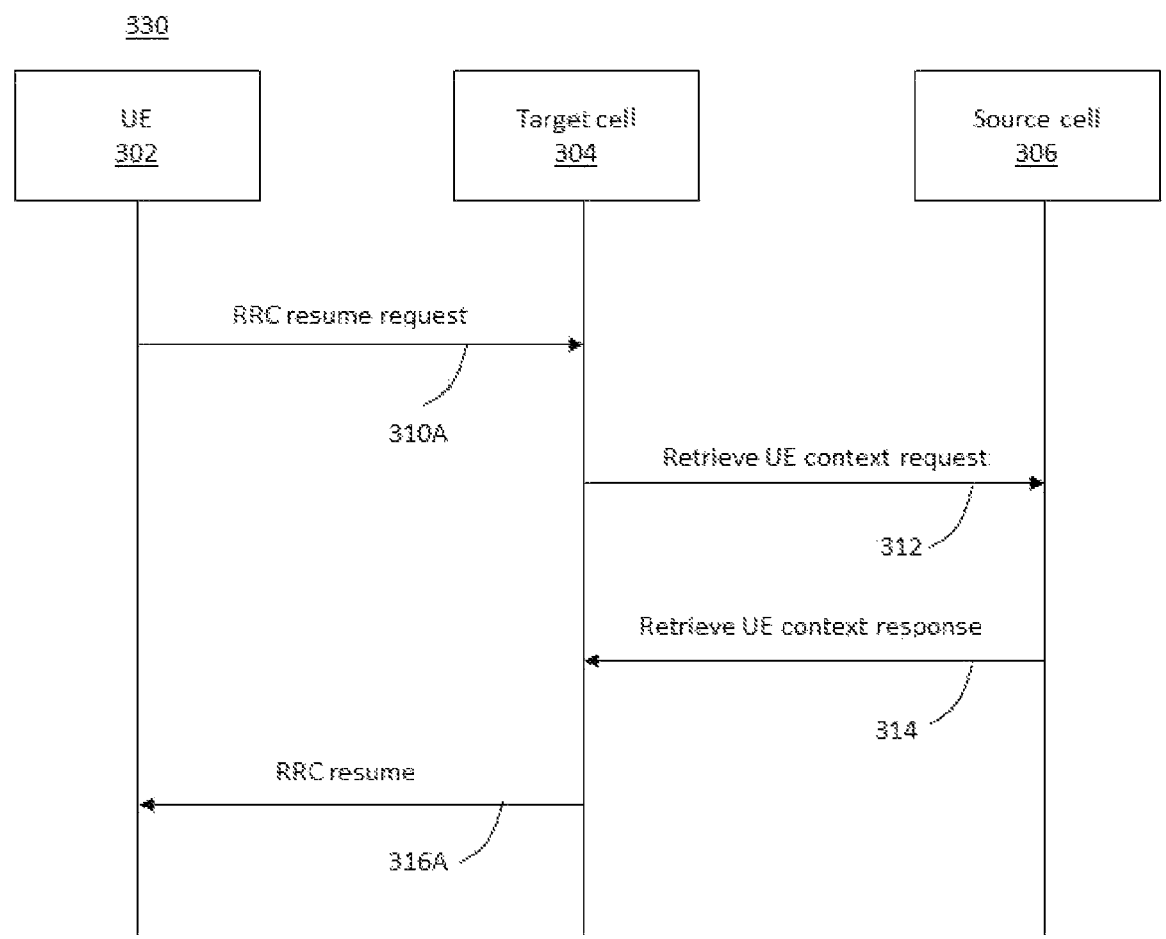
FIG. 3B is a block diagram of a radio resource control (RRC) resume procedure, in accordance with various embodiments.

FIG. 3B is a block diagram of a radio resource control (RRC) resume procedure 330, in accordance with various embodiments. The RRC resume procedure 330 may be performed between the UE 302, the target BS 304, and the source BS 306. The RRC resume procedure 330 may be substantially similar to the RRC set up procedure 300 of FIG. 3A but differ in that the operation 310 may be modified as described below with respect to operation 310A and that operation 316 may be modified as described below with respect to operation 316A. Other aspects may be the same and will not be repeated again for brevity.

Returning to FIG. 3B, at operation 310A, the UE 302 may send a RRC resume request message to the target BS 304. The RRC resume request message may be similar to the more generic message requesting connection with the target BS 304, discussed above. For example, the RRC resume request message may include UE information. However, the RRC resume request message may be sent specifically as part of a RRC resume procedure. More specifically, the RRC resume request may be sent in response to the UE 302 being in an idle state but seeking to return to an active state. Other aspects may be the same to the more generic message requesting connection with the target BS 304, discussed above, and will not be repeated again for brevity.

At operation 316A, the target BS 304 may send a RRC resume message to the UE 302. The RRC resume message may be similar to the more generic message including target BS response information, noted above. However, the RRC resume message may be sent in response to the RRC resume request message. Also, the RRC resume message may address aspects of the RRC resume procedure. Other features may be the same as the more generic target BS response information, discussed above, and will not be repeated again for brevity.

Figure 3C:
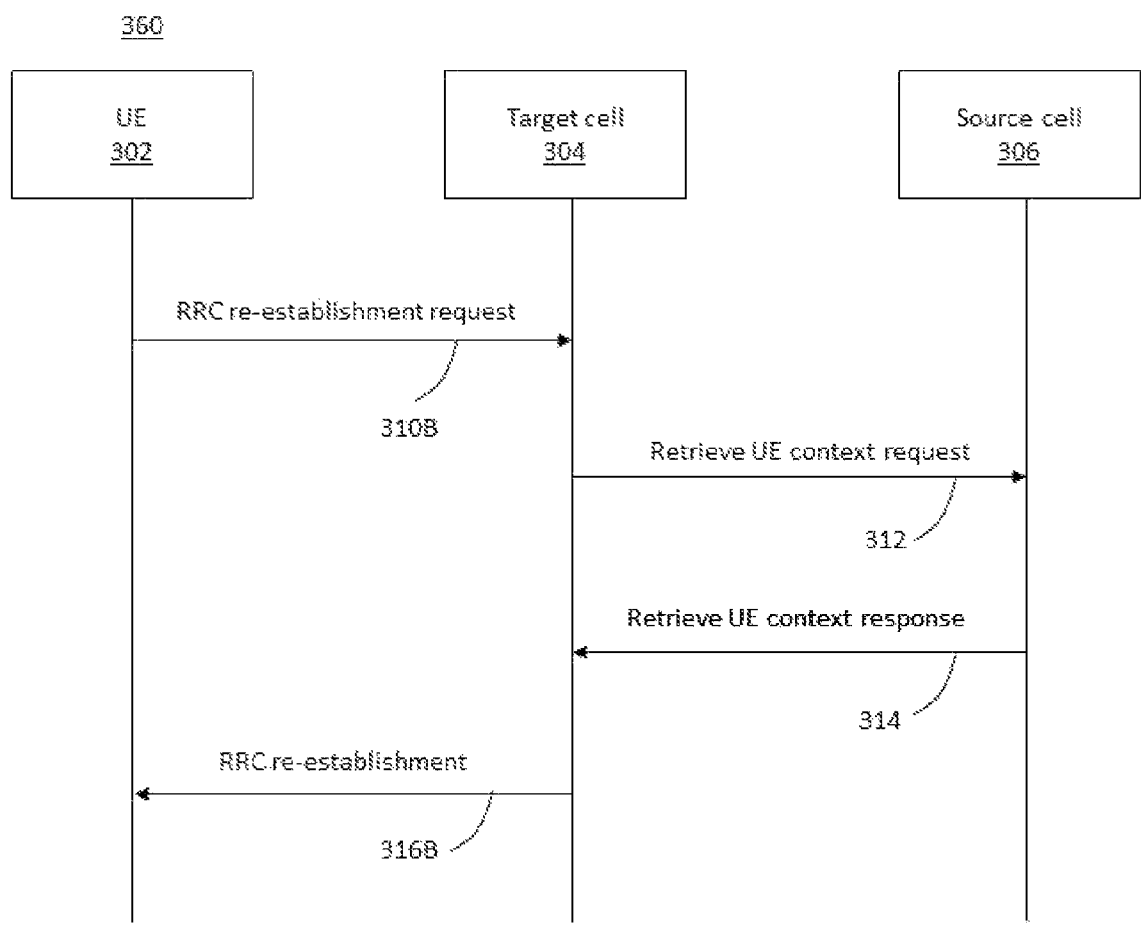
FIG. 3C is a block diagram of a radio resource control (RRC) re-establishment procedure, in accordance with various embodiments.

FIG. 3C is a block diagram of a radio resource control (RRC) re-establishment procedure 360, in accordance with various embodiments. The RRC re-establishment procedure 360 may be performed between the UE 302, the target BS 304, and the source BS 306. The RRC re-establishment procedure 360 may be substantially similar to the RRC set up procedure 300 of FIG. 3A but differ in that the operation 310 may be modified as described below with respect to operation 310B and that operation 316 may be modified as described below with respect to operation 316B. Other aspects may be the same and will not be repeated again for brevity.

Returning to FIG. 3C, at operation 310B, the UE 302 may send a RRC re-establishment request message to the target BS 304. The RRC re-establishment request message may be similar to the more generic message requesting connection with the target BS 304, discussed above. For example, the RRC re-establishment message may include UE information. However, the RRC re-establishment request message may be sent specifically as part of a RRC re-establishment procedure. More specifically, the RRC re-establishment request may be sent in response to the UE 302 that has lost a connection to a BS and is seeking re-establish communications with the target BS 304 by sending the RRC re-establishment request message to the target BS 304. Other aspects may be the same to the more generic message requesting connection with the target BS 304, discussed above, and will not be repeated again for brevity.

At operation 316B, the target BS 304 may send a RRC re-establishment message to the UE 302. The RRC re-establishment message may be similar to the more generic message, noted above. However, the RRC re-establishment message may be sent in response to the RRC re-establishment request message. For example, the target BS response information in the RRC re-establishment message may include information specific to the RRC re-establishment procedure. Other aspects may be the same to the more generic message including target BS response information, discussed above, and will not be repeated again for brevity.

In certain exemplary embodiments, a UE and associated BS may select parameters for verification and authentication information determination in a coordinated manner. For example, a UE and target BS or source BS may identify or determine a cell identifier (e.g., cell identifier that identifies a cell and associated BS) utilized to determine and/or verify UE authentication information in accordance with a predetermined rule. By using this predetermined rule, the UE, target BS and/or source BS may utilize a same cell identifier (e.g., cell identity that identifies a cell and associated BS) to determine their respective authentication information (e.g., shortMAC-I) for verification.

As a first example of the predetermined rule, the cell identifier (e.g., cell identity that identifies a cell and associated BS) corresponding to a first PLMN indicated in the system information of a target cell may be utilized as a cell identifier for authentication information determination. This first PLMN in the system information may be a PLMN with a lowest index value in a PLMN list in the system information of the target cell.

As a second example of the predetermined rule, the cell identifier (e.g., cell identity that identifies a cell and associated BS) corresponding to either a largest (e.g., greatest) or smallest numerical value of PLMN ID in a PLMN list may be utilized as a cell identifier for authentication information determination. This PLMN list may be included in the system information of a target cell.

As a third example of the predetermined rule, the cell identifier (e.g., cell identity that identifies a cell and associated BS) utilized for authentication information determination may be cell identifier with a largest or smallest numerical value within the cell identifiers included in the system information of a target cell. This largest or smallest numerical value may be determined by ordering all the cell identifier in accordance with their numerical value and selecting the one with the largest or smallest numerical value.

In various embodiments, either a UE or a BS may utilize one of the foregoing three predetermined rules for determining authentication information (e.g., a shortMAC-I) based on the cell identifier (e.g., cell identity that identifies a cell and associated BS) as one of the input parameters. This may be performed when initiating the above referenced RRC resume procedure or RRC re-establishment procedure. Stated another way, a UE may utilize one of the foregoing three predetermined rules for determining authentication information. Then, the UE may send the UE's authentication information (e.g., UE authentication information) to a target BS. The target BS that receives the RRC resume request message or the RRC re-establishment request message sent by the UE may also may utilize the same one of the foregoing three predetermined rules for determining cell identifier used for determining authentication information as that used by the UE. In certain embodiments, the target BS may send retrieve UE context request message to source BS. The retrieve UE context request message may include the cell identifier used for determining UE authentication information. For example, the target BS may not have the UE context information (e.g., UE access stratum (AS) context information) required to determine authentication information. In such situations, the target BS may send a retrieve UE context request message to the source BS. In certain embodiments, the source BS may then determine the authentication information and perform verification to verify that the authentication information determined by the source BS and UE provided authentication information match. The source BS may also produce, and send to the target BS, an indicator (e.g., as a new security key) that the authentication information determined by the source BS and the UE provided authentication match.

In optional embodiments, the retrieve UE context request message may include a PLMN identifier (e.g., PLMN ID) that may correspond to (e.g., be associated with) the cell identifier (e.g., cell identity that identifies a cell and associated BS) utilized for determining the authentication information. Then, the source BS may perform verification of the UE authentication information by determining the authentication information based on the PLMN identifier and the cell identifier. Also, in particular embodiments, the source BS may identify the target cell based on the PLMN identifier and the cell identifier.

In particular embodiments, the target BS may already have all the information that the target BS may need for determining authentication information for verification of the UE authentication information. This may be the case in embodiments in which the target BS is also the source BS.

In certain exemplary embodiments, verification of UE authentication information may be performed by determining several sets of authentication information. Then, the UE authentication information may be verified if the UE authentication information matches with any of the several sets of authentication information. For example, the target BS may send a retrieve UE context request message to the source BS, including information such as one of target cell's PLMN identifier and corresponding cell identifier (e.g., cell identity that identifies a cell and associated BS). In certain embodiments, the information may be a combination of both the target cell PLMN identifier (ID) and cell identifier (e.g., cell identity that identifies a cell and associated BS). The source BS may identify the target cell based on the PLMN identifier and the cell identifier. In certain embodiments, the source BS may calculate authentication information by utilizing each of the cell identifiers associated to the target cell. The source BS may indicate that at least one of the calculated authentication information matches the UE authentication information provided by UE (e.g., by sending the target BS a new security key).

In certain embodiments, the source BS may identify the target cell based on the retrieve UE context request message. Also, in particular embodiments, the PLMN identifier (ID) and/or the cell identifier (e.g., a cell identity that identifies a cell and associated BS) may be utilized to uniquely identify the target cell. In further embodiments, the source BS may identify the target cellbased on a target cell's physical cell identifier (PCI) and/or downlink carrier center frequency information. Also, this target cell PCI and downlink carrier center frequency information may be utilized to create a new security key for the UE in relation to the target cell and sent to the target BS As noted above, verification of UE authentication information may be performed by determining several sets of authentication information. These several sets of authentication information may be determined by a source BS. Also, these several sets of authentication information may be determined via use of different valid input parameters that may each be utilized to determine authentication information. The valid input parameters may each be predetermined, such as in accordance with one or more of the various predetermined rules of the exemplary embodiments discussed above and below. For example, the several sets of authentication information may each be based on different cell identifiers (e.g., cell identity that identifies a cell and associated BS) as valid input parameters. Then, the UE authentication information received from a UE may be verified when the UE authentication information matches with any of the several sets of authentication information determined by the source BS based on the valid input parameters.

Furthermore, a source BS may determine one or more new security keys based on the valid input parameters. For example, different PCI and downlink carrier central frequency information may be identified as valid input parameters for determination of one or more security keys. These one or more new security keys may be provided to the target BS for future communications between the target BS and the UE.

Figure 4:
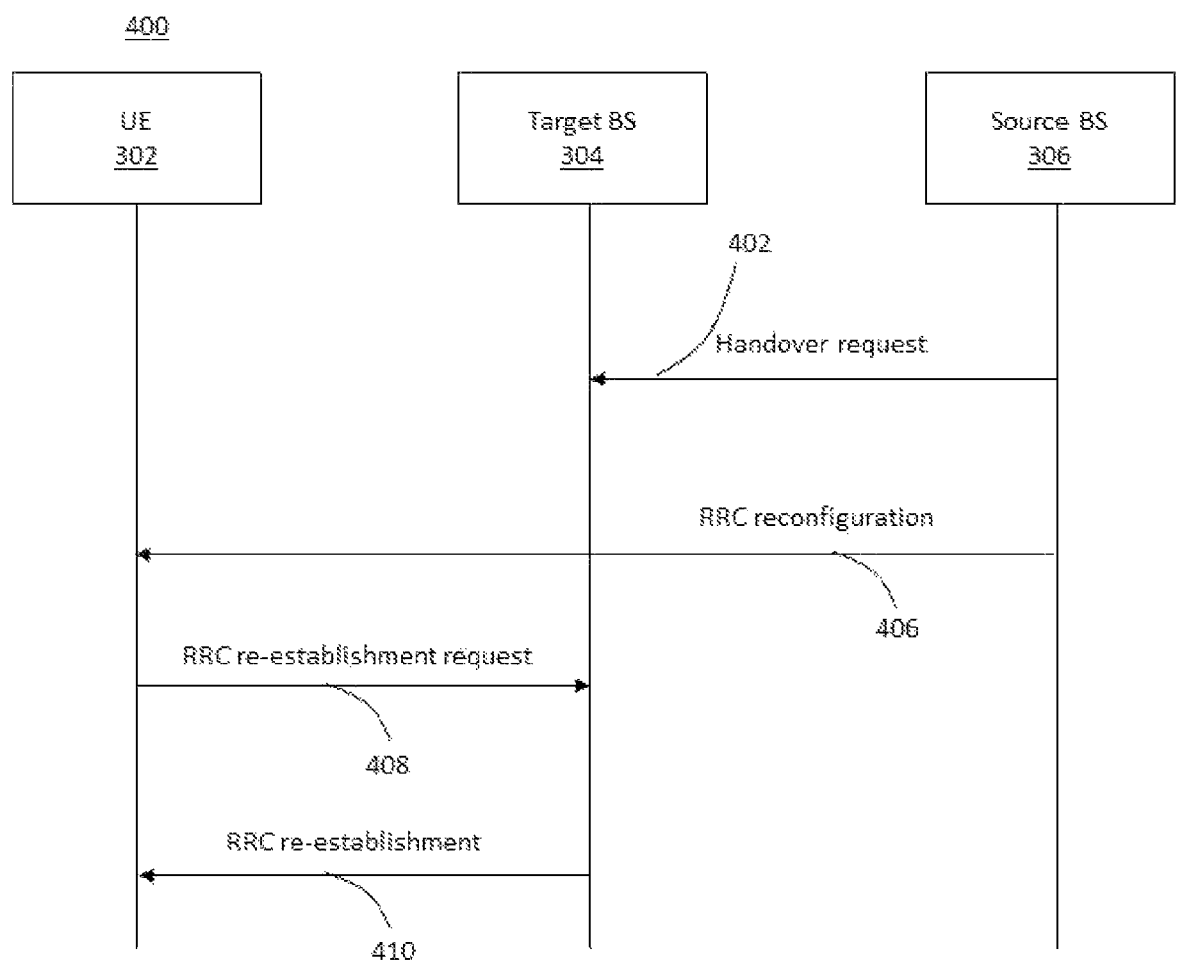
FIG. 4 is a block diagram of a post-handover radio resource control (RRC) re-establishment procedure, in accordance with various embodiments.

FIG. 4 is a block diagram of a post-handover radio resource control (RRC) re-establishment procedure 400, in accordance with various embodiments. The post-handover RRC re-establishment procedure 400 may be performed between the UE 302, the target BS 304, and the source BS 306. Each of the target BS 304 and the source BS 306 may be referred to, respectively, as a target BS or node and a source BS or node in certain embodiments.

At operation 402, the source BS 306 may send a handover request message to the target BS 304. The handover request message may be a message indicating that the target BS 304 should take over for the source BS 306 with respect to communications with the UE 302. Furthermore, based on the handover request message, various interactions may take place between the target BS 304 and the source BS 306. These interactions may include, for example, sending of a handover request message (handoverPreparationInformation), indicating re-establishment/UE context information (UE ID, target cell ID, source BS generated authentication information, new key used for UE in target cell) and the like to the target BS 304 from the source BS 306. This UE context information may be utilized by the target BS 304 to verify UE authentication information, as will be discussed further below. Also, this UE context information may include, for example, a security key that may be utilized for future communications between the target BS 304 and the UE 302.

At operation 406, the source BS 306 may send an RRC reconfiguration message to the UE 302. The RRC reconfiguration message may inform the UE that the source BS 306 has already sent a handover request to the target BS in operation 402. Stated another way, the RRC reconfiguration message may inform the UE 302 that the target BS 304 is to take over for the source BS 306. If a handover failure occurs at the UE (e.g., if the UE fails to connect to the target BS 304 according to a received RRC reconfiguration message), the UE 302 may then attempt to re-establish communications with the target BS 304 via sending a RRC re-establishment request to the target BS 304.

At operation 408, the UE 302 may send a RRC re-establishment request to the target BS 304. The RRC re-establishment request (e.g., RRC re-establishment request message) may include UE information, which may be utilized for verification of UE authentication information. This UE information may include the UE authentication information (e.g., a shortMAC-I), a UE ID, and the like. For example this UE information may include various parameters that may be selected and/or processed for verification of UE authentication information. In certain embodiments, the RRC re-establishment request message may be sent specifically as part of a RRC re-establishment procedure.

Based on the information received from the previous operations, the target BS may perform verification, or a determination of verification, by comparing the UE generated authentication information and source BS generated authentication information for a match. If there is a match, then the UE generated authentication information (e.g., UE authentication information) is verified.

At operation 410, the target BS 304 may send a RRC re-establishment message to the UE 302 to establish a connection with the UE (e.g., the connection requested by the UE in operation 408). As noted above, this verification may be performed by the target BS 304 based on authentication information received from the source BS 306 during the interactions between the source and target BSes. Also, the RRC re-establishment message may include information specific to (e.g., addressing) aspects of the RRC re-establishment procedure.

In certain exemplary embodiments, rules for determining authentication information may be specific for a post-handover RRC re-establishment procedure. For example, during a post-handover RRC re-establishment procedure, a source BS (e.g., source RAN node) may have access to a list of re-establishment information. This re-establishment information may be sent from the source BS to the target BS to establish communications between UE and the target BS. Also, this re-establishment information may be utilized by the target BS for verification of the UE authentication information after a handover success or after a handover failure. In certain embodiments, this re-establishment information may include a list of target cell identifiers (e.g., cell identifiers that identify the target BS), UE authentication information (e.g., a shortMAC-I) and a security key for communications between the UE 302 and the target BS 304. In certain optional embodiments, the re-establishment information may be contained in a "handoverpreparationinformation" information element or field and sent to the target BS from the source BS via a handover request message or along with the handover request message.

In numerous embodiments, the cell identifier (e.g., cell identity that identifies the cell and associated BS) provided as part of the re-establishment information or utilized for determination of authentication information may be determined in one of the following exemplary techniques. As a first exemplary technique, the cell identifier utilized for determination of authentication information (e.g., shortMAC-I) may be the cell identifier corresponding (e.g., associated) with a PLMN of the source cell (e.g., a source PLMN or the PLMN ID associated with the UE before handover from the source BS). A cell identifier may be identified in this manner for authentication information determination at both a UE and a BS (e.g., the target or source BS). This cell identifier corresponding (e.g., associated) with a source PLMN may be identified in system information of the target cell. In certain embodiments, this cell identifier corresponding with a source PLMN may be accorded a higher priority for selection in the determination of authentication information than other cell identifiers. Also, in certain embodiments, this cell identifier corresponding (e.g., associated) with a source PLMN may be utilized by a source BS to determine authentication information, which is then sent to the target BS.

As a second exemplary technique, the cell identifier utilized for determination of authentication information (e.g., shortMAC-I) may be the cell identifier corresponding (e.g., associated) with a PLMN of the target BS (e.g., a target PLMN or the PLMN ID associated with a target cell). A cell identifier may be identified in this manner for authentication information determination at both a UE and a BS (e.g., the target or source BS). This cell identifier corresponding (e.g., associated) with a target PLMN may be identified in system information of the target cell. In certain embodiments, this cell identifier corresponding with a target PLMN may be accorded a higher priority for selection in the determination of authentication information than other cell identifiers. Also, in certain embodiments, this cell identifier corresponding with a target PLMN may be utilized by a source BS to determine authentication information, which is then sent to the target BS.

As a third exemplary technique, the cell identifier utilized for determination of authentication information (e.g., shortMAC-I) may be the cell identifier corresponding (e.g., associated) with any PLMN that the UE may communicate with or support (e.g., a supported PLMN, registered PLMN, equivalent PLMN of registered PLMN, selected PLMN, and/or equivalent PLMN of selected PLMN). A cell identifier may be identified in this manner for authentication information determination at both a UE and a BS (e.g., the target or source BS). This cell identifier corresponding (e.g., associated) with a supported PLMN may be identified in system information of the target cell. In certain embodiments, this cell identifier corresponding with a supported PLMN may be accorded a higher priority for selection in the determination of authentication information than other cell identifiers. Also, this cell identifier corresponding with a supported PLMN may be utilized by a source BS to determine authentication information, which is then sent to the target BS.

As a fourth exemplary technique, the cell identifier utilized for determination of authentication information (e.g., shortMAC-I) may be the cell identifier corresponding (e.g., associated) with a first PLMN (e.g., a PLMN with a lowest index value) in a PLMN list accessible to the target cell. A cell identifier may be identified in this manner for authentication information determination at both a UE and a BS (e.g., the target or source BS). This cell identifier corresponding (e.g., associated) with a first PLMN may be identified in system information of the target cell. In certain embodiments, this cell identifier corresponding with a first PLMN may be accorded a higher priority for selection in the determination of authentication information than other cell identifiers. Also, this cell identifier corresponding with a first PLMN may be utilized by a source BS to determine authentication information, which is then sent to the target BS.

As a fifth exemplary technique, the cell identifier utilized for determination of authentication information (e.g., shortMAC-I) may be the cell identifier corresponding (e.g., associated) with a largest or smallest value PLMN identifier or ID (e.g., a PLMN ID with a largest or smallest numerical value) in a PLMN ID list accessible to the target cell. A cell identifier may be identified in this manner for authentication information determination at both a UE and a BS (e.g., the target or source BS). This cell identifier corresponding (e.g., associated) with a largest or smallest value PLMN ID may be identified in system information of the target cell. In certain embodiments, this cell identifier corresponding with a largest or smallest value PLMN ID may be accorded a higher priority for selection in the determination of authentication information than other cell identifiers. Also, this cell identifier corresponding with a largest or smallest value PLMN may be utilized by a source BS to determine authentication information, which is then sent to the target BS.

As a sixth exemplary technique, a largest or smallest value cell identifier in a list of cell identifiers accessible to the target BS may be utilized for determination of authentication information (e.g., shortMAC-I). A largest or smallest value cell identifier may be identified in this manner for authentication information determination at both a UE and a BS (e.g., the target or source BS). This largest or smallest value cell identifier may be identified in system information of the target cell. In certain embodiments, this largest or smallest value cell identifier may be accorded a higher priority for selection in the determination of authentication information than other cell identifiers. Also, this largest or smallest value cell identifier may be utilized by a source BS to determine authentication information, which is then sent to the target BS.

As a seventh exemplary technique, every possible cell identifier accessible to the target BS may be utilized for determination of authentication information (e.g., shortMAC-I). These cell identifiers may be identified in this manner for authentication information determination at both a UE and a BS (e.g., the target or source BS). These cell identifiers may be identified in system information of the target cell. In certain embodiments, these cell identifiers may be utilized by a source BS to determine authentication information, which is then sent to the target BS. Also, a listing of every cell identifier accessible to the target BS may be sent by the source BS to the target BS as well. In certain embodiments, a UE may select only one cell identifier out of every possible cell identifier accessible to the target cell to determine UE authentication information for transmission to the target BS.

Optionally, in particular embodiments, the source BS also sends to the target BS a PLMN identifier (e.g., PLMN ID) associated with the cell identifier as part of the re-establishment information. The PLMN identifier may be used by the target BS to determine a unique target cell identifier for use in determining the authentication information. This unique target cell identifier may also be utilized to determine a security key used for communication between a UE and target BS. However, a source BS may not need to indicate a PLMN identifier to the target BS when the PLMN identifier is already included in a handover request message sent from the source BS to the target BS. In certain embodiments, the PLMN identifier is the PLMN ID of target cell CGI (cell global ID) which is included in handover request message.

In certain embodiments, the cell identifier utilized for determination of authentication information (e.g., short-MAC-I) may be determined or identified from a combination of the above exemplary techniques. For example, the cell identifier utilized for determination of authentication information (e.g., shortMAC-I) may be determined or identified from a combination of the first exemplary technique and the fourth exemplary technique.

In certain embodiments, a target BS may be configured with a same PLMN ID or a equivalent PLMN ID as that of a source PLMN ID (e.g., a PLMN ID associated with a source BS). In particular embodiments, a source BS may utilize a cell identifier associated with the first PLMN ID (e.g., a PLMN ID with a lowest index value in an indexed list of PLMN IDs) to determine authentication information. The source BS may then send the determined authentication information to the target BS along with the utilized cell identifier.

In further embodiments, when a UE initiates a RRC re-establishment request, the UE may determine whether the target BS has a same or equivalent PLMN as the source PLMN ID (e.g., an identifier of the source PLMN associated with the source cell). If so, the UE may utilize the same or equivalent PLMN ID as that of the source PLMN to determine the target cell identifier in the course of determining authentication information. In certain embodiments, if the target cell does not have a same or equivalent PLMN ID of as the source PLMN ID, the UE may utilize a cell identifier corresponding to a first PLMN, as discussed above.

In particular embodiments, when the UE authentication information does not match the authentication information determined by the source BS, the target BS may then initiate a retrieve UE context information procedure to source BS. The source BS may perform verification based on the information provided by target BS.

In certain exemplary embodiments, data or information carried within messages or other communications between BSes may be formatted in particular set manner. For example, a first BS may send a message carrying cell configuration information (e.g., configuration information for a cell) to a second BS. The cell configuration information may include, for example, a first PLMN ID in a PLMN ID list configured in system information of the cell, as well as a corresponding cell identifier (e.g., cell identity associated with a cell and associated BS).

This cell configuration information may be expressed in one of the following exemplary expressions. For example, as a first exemplary expression, the first PLMN identifier (ID) in a list of PLMN identifiers may be the first PLMN identifier as found in the system information of the cell. The cell identifier (e.g., cell identity with a cell and associated BS) corresponding to the first PLMN identifier (e.g., a PLMN identifier with a lowest index value) of the cell configuration information may be the first cell identifier (e.g., a cell identifier with a lowest index value) found in the system information of the cell.

In certain embodiments, the first cell identifier (e.g., cell identity for a cell and associated BS) in a list of cell identifiers may be the first cell identifier as found in the system information of the cell. Stated another way, the order of a PLMN identifier in a list of PLMN identifiers or cell identifiers in a list of cell identifiers within cell configuration information may be the same as that found in the system information of the cell that sends the cell configuration information.

As a second exemplary expression, an indicator may be associated with a PLMN identifier (PLMN ID) in a list of PLMN identifiers within the cell configuration information. This indicator may indicate whether the corresponding PLMN identifier is the first PLMN identifier configured in the system information of the cell. This identifier may be optional in various embodiments. In certain embodiments, this indicator may be absent for a PLMN identifier in a list of PLMN identifiers within the cell configuration information. In such a situation, the PLMN identifier corresponding to the absent indicator may be determined to not be the first PLMN identifier in the system information of the cell.

In particular embodiments, an indicator may be associated with a cell identifier (e.g., cell identity of a cell and associated BS) in a list of cell identifiers within the cell configuration information. This indicator may indicate whether the corresponding cell identifier is the first cell identifier configured in the system information of the cell. This identifier may be optional in various embodiments. In certain embodiments, this indicator may be absent for a cell identifier in a list of cell identifiers within the cell configuration information. In such a situation, the cell identifier corresponding to the absent indicator may be determined to not be the first cell identifier in the system information of the cell.

As a third exemplary expression, a first PLMN identifier (ID) and its corresponding cell identifier (e.g., cell identity of a cell and associated BS) may be carried in (e.g., included with) the cell configuration information. This may be included in the cell configuration information in addition to the cell identifier corresponding to a PLMN identifier of an inter-RAN node interface (e.g., interface among BSes). In this third exemplary expression, the interface between the first BS (e.g., RAN node one or first BS) that sends the cell configuration information and the second BS (e.g., RAN node two) that receives the cell configuration information (e.g., RAN node two) may be PLMN specific. Also, the interface between the first BS and the second BS may be dedicated for messages related to a specific PLMN.

In certain exemplary embodiments, a target BS may request UE context information from a source BS by sending the following information to the source BS: a target cell identifier (e.g., an identifier of a target cell and associated target BS), authentication information sent by the UE, a UE identifier, a PCI, and/or downlink carrier central frequency information (e.g., a evolved universal mobile telecommunication systems terrestrial radio access (E-UTRA) absolute radio frequency channel number in downlink (ERFCN-DL) or an absolute radio frequency channel number in downlink (ARFCN-DL)). The source BS that receives the request for the UE context information may derive a new security key using the PCI and the downlink carrier central frequency information. This new security key may be utilized by the source BS or the target BS (when the source BS sends the new security key to the target BS) for communication between target BS and UE in the cell of the target BS. It can be noted that the UE can determine the PCI and downlink carrier central frequency information independently. Thus, it is possible that each of the UE, target BS, and source BS may consistently determine the new security key using the same input parameters.

In certain exemplary embodiments, the new security key for use with the target BS may be determined at the source BS itself. For example, the source BS may utilize the following parameters to determine the new security key: the PCI of a source cell and a downlink carrier central frequency information of the source cell. In optional embodiments, a UE identifier (e.g., UE identity information) may also be utilized as a parameter to determine the new security key. The UE identifier may include, for example, a resume identifier (ID) for a RRC resume procedure or a C-RNTI utilized by the UE when communicating with the source BS for a RRC re-establishment procedure. The new security key may be determined at the source BS in the above referenced manner in both a RRC resume procedure and a RRC re-establishment procedure.

During a post-handover RRC re-establishment procedure, the new security key may be determined at the source BS in the above referenced manner. The source BS may then send the new security key to the target BS via a handover request message (e.g., within a "handoverpreparationinformation" field of the handover request message).

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element or embodiment herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, one or more of the functions described in this document may be performed by means of computer program code that is stored in a "computer program product", "computer-readable medium", and the like, which is used herein to generally refer to media such as, memory storage devices, or storage unit. These, and other forms of computer-readable media, may be involved in storing one or more instructions for use by processor to cause the processor to perform specified operations. Such instructions, generally referred to as "computer program code" (which may be grouped in the form of computer programs or other groupings), which when executed, enable the computing system to perform the desired operations.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method performed by a first communication node, comprising:
   receiving a request from a communication device to establish a first connection associated with a second connection previously established between the communication device and a second communication node, wherein the request comprises first authentication information generated by the communication device;
   sending a message to the second communication node to retrieve context information of the communication device, the message comprising a cell identifier (ID) of a cell that is (i) associated with the first communication node and (ii) corresponds to a first public land mobile network (PLMN) indicated in system information of the cell, for determining second authentication information generated by the second communication node; and
   establishing the first connection between the communication device and the first communication node based on a determination that the second authentication information matches the first authentication information, wherein the second authentication information is based on a predetermined subset of input parameters, and
   wherein the predetermined subset of input parameters are based on a first PLMN value of a plurality of PLMN values, wherein the first PLMN value corresponds to the first PLMN that corresponds to the cell ID of the cell and is associated with the first communication node in the message.

2. The method of claim 1, further comprising performing the determination that the second authentication information matches the first authentication information at the first communication node.

3. The method of claim 1, wherein the first connection is a radio resource control (RRC) connection.

4. The method of claim 1, further comprising:
   receiving a response message from the second communication node, the response message comprising the context information of the communication device.

5. The method of claim 1, wherein the determination that the second authentication information matches the first authentication information is performed at the second communication node.

6. The method of claim 1, wherein the predetermined subset of input parameters are based on a value of the cell ID.

7. A first communication node, comprising:
   a transceiver configured to:
      receive a request from a communication device to establish a first connection associated with a second connection previously established between the communication device and a second communication node, wherein the request comprises first authentication information generated by the communication device; and
      send a message to the second communication node to retrieve context information of the communication device, the message comprising a cell identifier (ID) of a cell that is (i) associated with the first communication node and (ii) corresponds to a first public land mobile network (PLMN) indicated in system information of the cell, for determining second authentication information generated by the second communication node; and
   at least one processor configured to:
      establish the first connection between the communication device and the first communication node based on a determination that the second authentication information matches the first authentication information, wherein the second authentication information is based on a predetermined subset of input parameters,
      wherein the predetermined subset of input parameters are based on a first PLMN value of a plurality of PLMN values, wherein the first PLMN value corresponds to the first PLMN that corresponds to the cell ID of the cell and is associated with the first communication node in the message.

8. The first communication node of claim 7, wherein the at least one processor is configured to perform the determination that the second authentication information matches the first authentication information.

9. The first communication node of claim 7, wherein the current connection is a radio resource control (RRC) connection.

10. The first communication node of claim 7, wherein the transceiver is configured to:
   receive a response message from the second communication node, the response message comprising the context information of the communication device.

11. The first communication node of claim 7, wherein the determination that the second authentication information matches the first authentication information is performed at the second communication node.

12. The first communication node of claim 7, wherein the predetermined subset of input parameters are based on a value of the cell ID.

13. A non-transitory computer-readable medium of a first communication node having stored thereon computer-executable instructions that when executed cause the first communication node to:
receive a request from a communication device to establish a first connection associated with a second connection previously established between the communication device and a second communication node, wherein the request comprises first authentication information generated by the communication device; and
send a message to the second communication node to retrieve context information of the communication device, the message comprising a cell identifier (ID) of a cell that is (i) associated with the first communication node and (ii) corresponds to a first public land mobile network (PLMN) indicated in system information of the cell, for determining second authentication information generated by the second communication node; and
establish the first connection between the communication device and the first communication node based on a determination that the second authentication information matches the first authentication information, wherein the second authentication information is based on a predetermined subset of input parameters,
wherein the predetermined subset of input parameters are based on a first PLMN value of a plurality of PLMN values, wherein the first PLMN value corresponds to the first PLMN that corresponds to the cell ID of the cell and is associated with the first communication node in the message.

14. The non-transitory computer-readable medium of claim 13, wherein the computer executable instructions further cause the first communication node to perform the determination that the second authentication information matches the first authentication information.

15. The non-transitory computer-readable medium of claim 13, wherein the first connection is a radio resource control (RRC) connection.

16. The non-transitory computer-readable medium of claim 13, wherein the computer executable instructions further cause the first communication node to receive a response message from the second communication node, the response message comprising the context information of the communication device.

17. The non-transitory computer-readable medium of claim 13, wherein the determination that the second authentication information matches the first authentication information is performed at the second communication node.

18. The non-transitory computer-readable medium of claim 13, wherein the predetermined subset of input parameters are based on a value of the cell ID.

* * * * *